United States Patent [19]
Bohannon, Jr. et al.

[11] 3,733,672
[45] May 22, 1973

[54] APPARATUS FOR AUTOMATICALLY INSERTING COMPONENTS IN A WORKPIECE

[75] Inventors: William D. Bohannon, Jr., Graham; Hoye D. Church, Burlington, both of N.C.

[73] Assignee: Western Electric Company Incorporated, New York, N.Y.

[22] Filed: Sept. 13, 1971

[21] Appl. No.: 179,848

[52] U.S. Cl. ............... 29/203 B, 29/208 E, 29/211 R
[51] Int. Cl. ...... H05k 13/04, B23p 19/04, B23q 7/10
[58] Field of Search ......................... 29/203 B, 203 R, 29/203 D, 208 R, 208 E, 211 R

[56] References Cited

UNITED STATES PATENTS 3,471,915  10/1969  Lamoureux..........................29/203 B
3,590,462  7/1971  Mracek..............................29/203 B

*Primary Examiner*—Thomas H. Eager
*Attorney*—W. M. Kain, J. B. Hoofnagle, Jr. and W. L. Williamson

[57] ABSTRACT

A machine that automatically inserts electrical components in preselected locations on a workpiece includes a hopper assembly which houses a plurality of containers and means connected with the hopper assembly to dispense the containers from the assembly to a station remote from the assembly. The station includes means for selectively ejecting components within the containers therefrom and a collector assembly movable to and from the station for receiving the ejected components. A transfer assembly picks up the components from the collector assembly and transfers the components to the preselected location on the workpiece.

8 Claims, 9 Drawing Figures

PATENTED MAY 22 1973
3,733,672
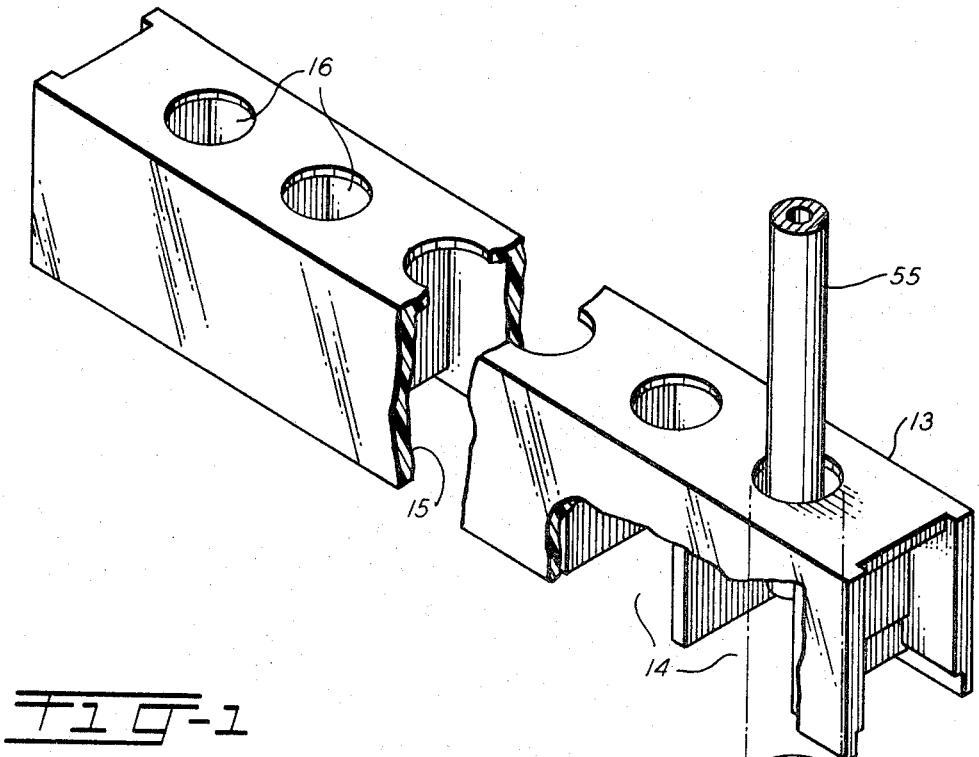
Fig-1
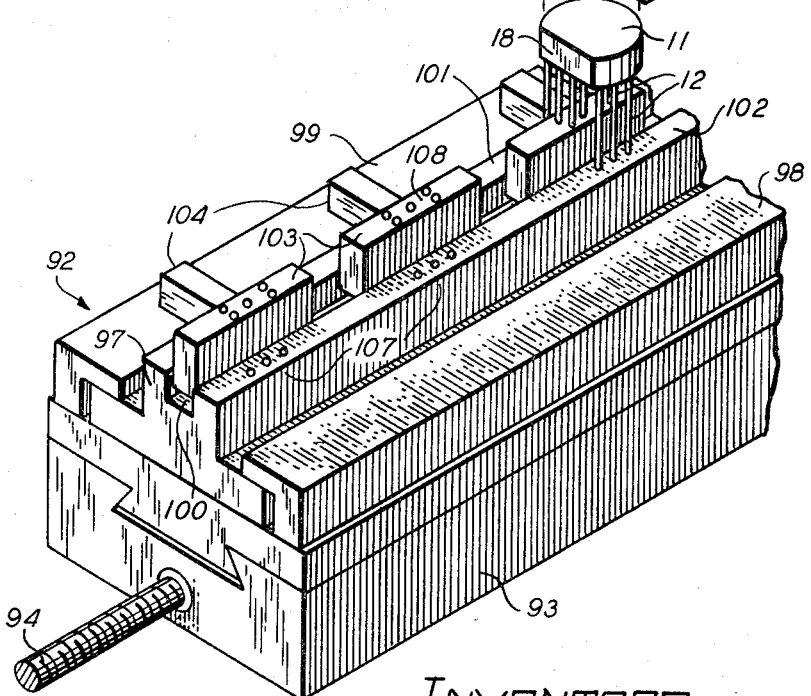
INVENTORS
W. D. BOHANNON
H. D. CHURCH
By J. A. Finlayson, Jr.
ATTORNEY

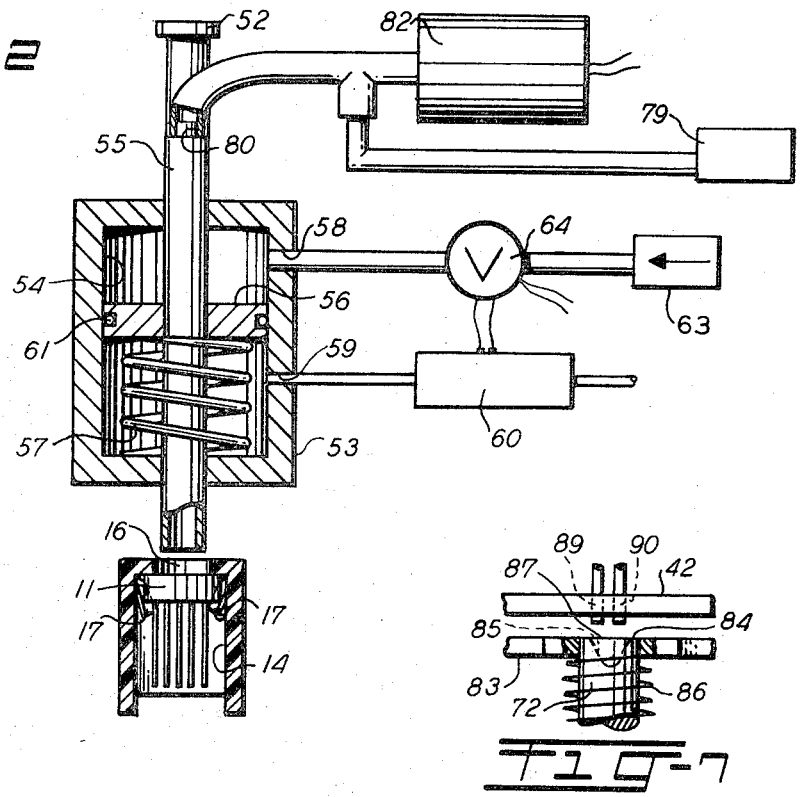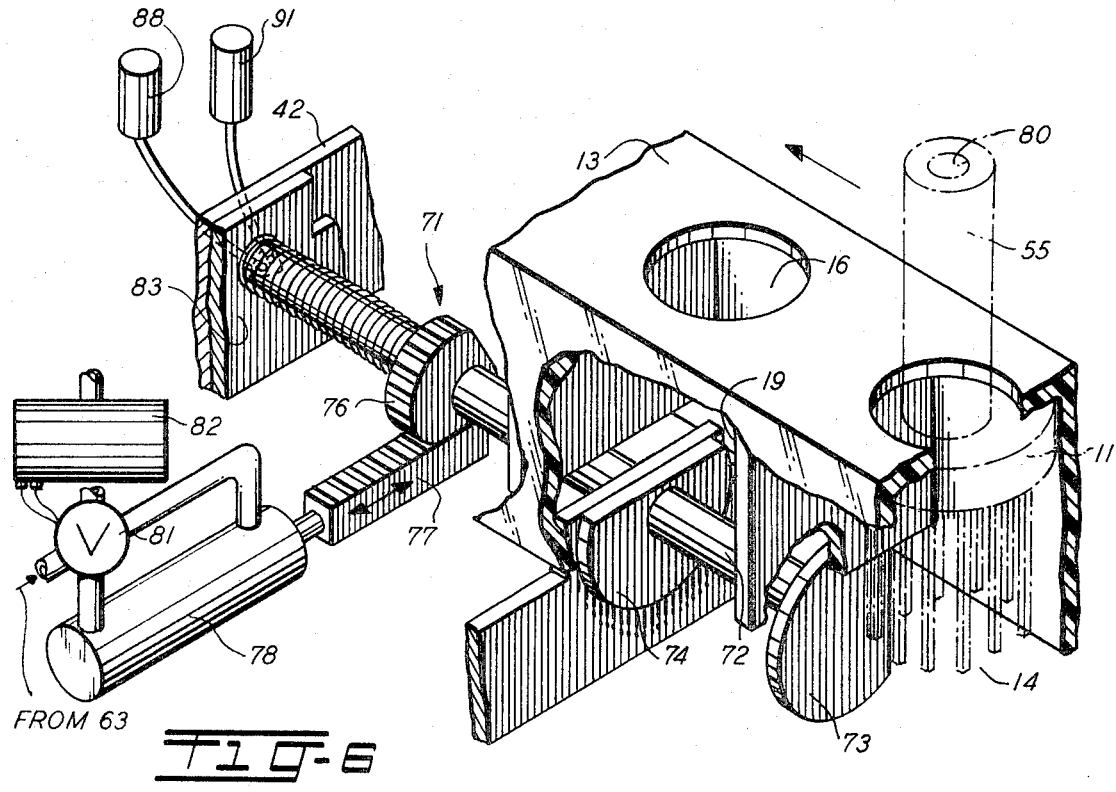

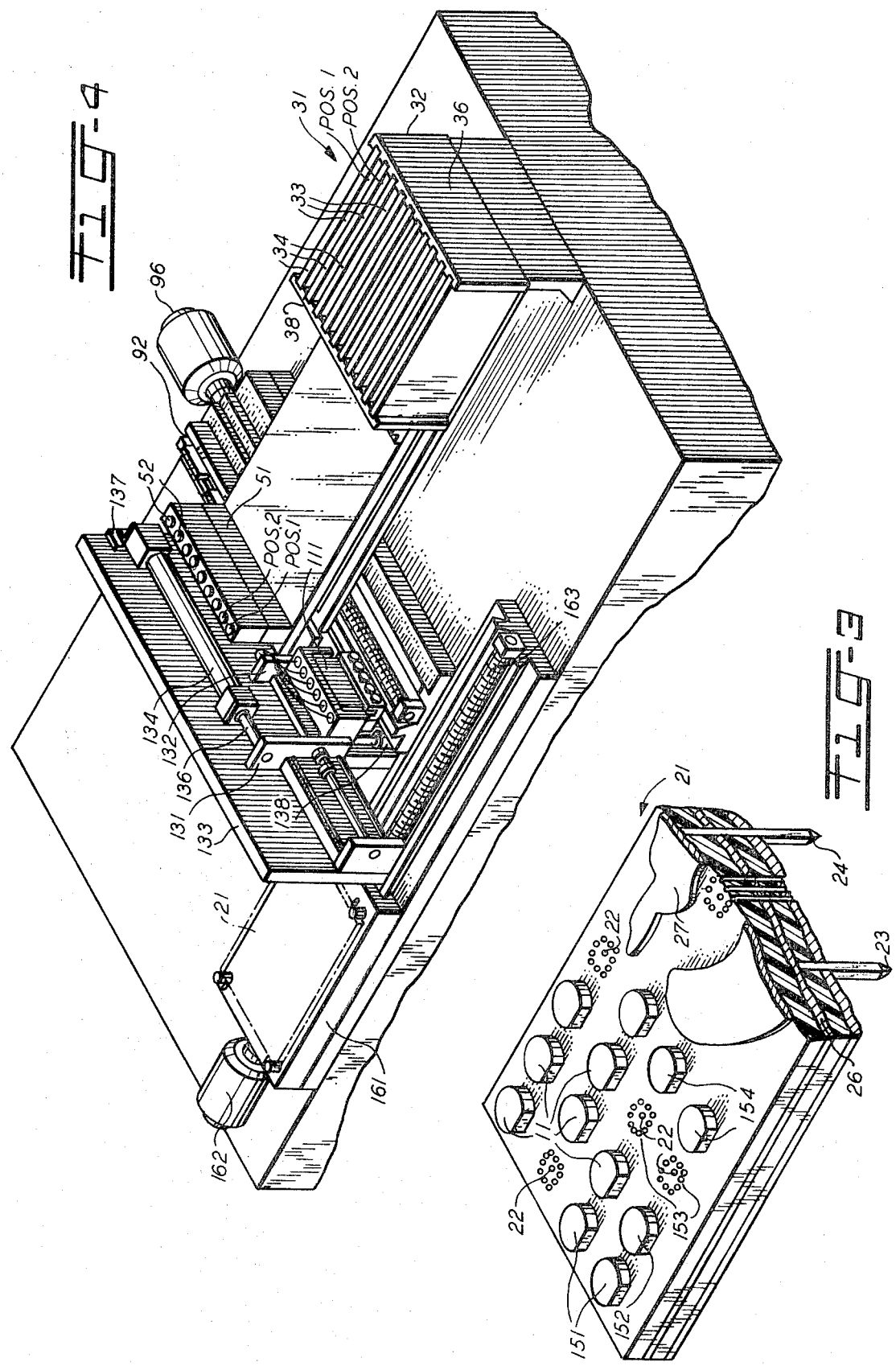

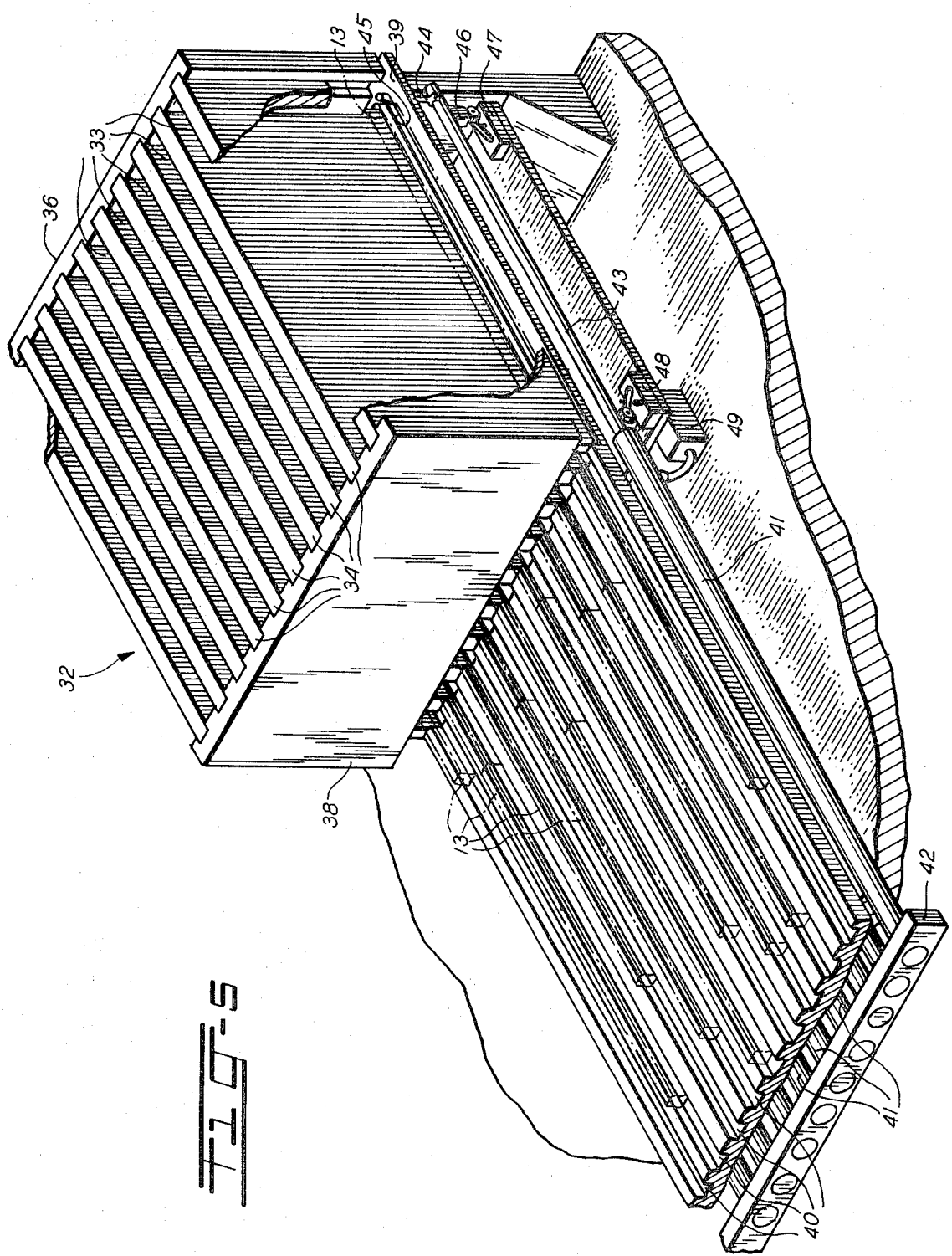

३,७३३,६७२

APPARATUS FOR AUTOMATICALLY INSERTING COMPONENTS IN A WORKPIECE

CROSS-REFERENCE TO RELATED APPLICATIONS

This application is related to co-pending applications to W. O. Bohannon, Jr., Ser. No. 50,547, filed June 29, 1970, U.S. Pat. No. 3,700,100, entitled "Package" and Ser. No. 179,849 filed on even date entitled "Dispensing Control Mehcanism."

BACKGROUND OF THE INVENTION

1. Field of the Invention

This invention relates generally to a component transfer system, and more particularly, to a novel machine that will automatically transfer a plurality of electrical components, selectively from a container to a desired location on a workpiece.

2. Technical Consideration and Prior Art

In the manufacture of logic units that are employed in logic chassis for complex electrical equipment, such as computers, switching systems, and the like, a plurality of integrated circuit packages (hereinafter called ICPs) are mounted on a circuit board in a desired arrangement to form the circuitry thereof. The ICP has an integrated circuit formed therein, such as a plurality of AND gates, OR gates, flip-flops, amplifiers, or other circuitry. Extending from each ICP are a plurality of conductive leads, which make up the terminals thereof. To mount the ICP on the circuit board, the ICPs are inserted in patterned holes which are selectively arranged in rows on the circuit board. The terminals extend through the holes beyond the underneath side of the circuit board. After the ICPs are inserted into the circuit board, a conventional automatic wiring machine is used to make various electrical connections between the terminals and respective power plane terminals and ground plane terminals located on the circuit board.

Presently, the ICPs are manually inserted into the circuit board by an operator who follows a guide chart indicating where to selectively place certan coded ICPs at desired locations on the circuit board. The disadvantages of this technique are rather obvious. For one, accurate placement of an ICP at a desired location on the circuit board is subject to operator error. Moreover, it is time and cost consuming with this technique to complete the processing for circuit boards. In addition, when errors are made by the operator during the manual processing of a circuit board, such as inaccurately inserting the many different coded ICPs in the varying selected patterns on the board, it is extremely difficult to find the defect on the board and correct the error. Thus, a circuit board incorrectly arrayed with the ICPs must be reprocessed.

SUMMARY OF THE INVENTION

The present invention is drawn to a novel machine, which automatically mounts a plurality of ICPs in the proper array on a circuit board in less time and in a more accurate manner than is accomplished by manual mounting.

A general object of the invention is to provide a machine that will automatically select a plurality of ICP components of different codes and arrange them in a desired array on a circuit board.

A more specific object of the invention is to provide a machine that will automatically dispense a plurality of different coded ICPs from any of a plurality of magazines, arrange the ICPs in a desired linear array as they are dispensed, and transfer the array to a desired location on a circuit board.

Another object of the invention is to provide a technique for continuously feeding a plurality of rows of magazines containing ICPs to a dispensing station, each row designating a different code of ICP and each magazine containing a plurality of coded ICPs, selectively ejecting from each row one at a time, a desired coded ICP from the magazine into a desired array on a support, and transferring the array from the support to a desired location on a printed circuit board.

Illustratively, one feature of the machine includes a hopper assembly wherein a plurality of magazines containing the ICPs are loaded. The magazines are automatically fed from the bottom of the hopper assembly along individual tracks.

Another feature of the machine is a dispensing assembly. The dispensing assembly includes a piston arrangement for ejecting the ICPs from the magazine. The assembly also includes a mechanism under the piston arrangement for selectively advancing the magazines under the dispensing assembly.

A further feature of the invention is a collector bar slide assembly. The collector bar slide assembly indexes beneath the dispensing assembly, and receives selected coded ICPs ejected from the magazine in a desired preselected row arrangement.

Still another feature of the invention is a transfer station assembly. The transfer assembly lifts a row of ICPs from the collector bar assembly, positions the row over a circuit board, and lowers the ICPs into the circuit board.

DESCRIPTION OF THE DRAWINGS

A more complete understanding of the invention and its advantages will appear more fully from the following detailed description taken in conjunction with the appended drawings, wherein:

FIG. 1 is an exploded perspective view of a magazine which houses a plurality of ICPs, illustrating the manner in which an individual ICP is ejected therefrom onto a collector bar assembly;

FIG. 2 is a fragmentary side view in section illustrating a piston arrangement for dispensing an ICP from a chamber in the magazine;

FIG. 3 is an exploded perspective view of a circuit board, such as that employed as a logic chassis for computers, illustrating the manner in which a plurality of rows of ICPs are mounted on the circuit board;

FIG. 4 is a perspective view of an ICP dispensing and insertion machine embodying the present invention, showing various parts of the machine and their relationship to one another;

FIG. 5 is a perspective view of the hopper assembly of FIG. 4, showing in detail the manner of dispensing and conveying magazines from the hopper;

FIG. 6 is a blown-up perspective view partially in section of an escapement mechanism for selectively indexing a magazine from an adjacent track into a communicative position with the piston arrangement;

FIG. 7 is a planar view of a section of FIG. 6, illustrating in greater detail a part of the mechanism of FIG. 6;

DETAILED DESCRIPTION

Figure 8:
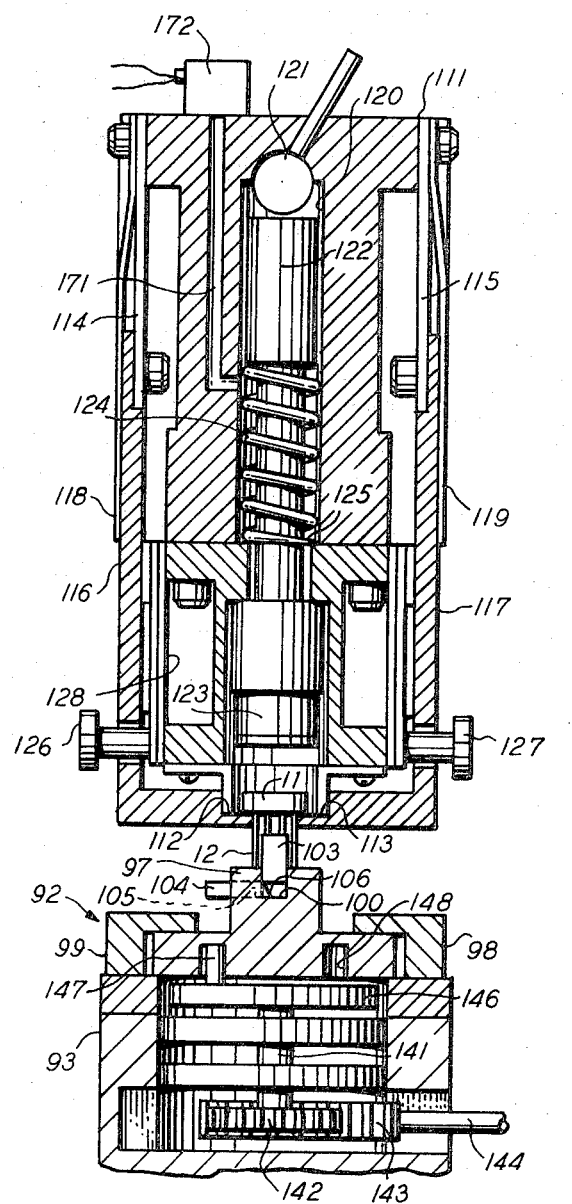
FIG. 8 is an end view of a transfer station assembly illustrating the manner in which a gripping member of the transfer assembly is positioned over a respective ICP positioned on the collector bar assembly and also illustrating a system for straightening the terminals of the ICP prior to transfer.

Referring more particularly to the drawing, FIG. 1 illustratively shows an ICP 11 having a plurality of leads 12—12 extending therefrom. As stated previously, the ICP has an integrated circuit formed therein such as a plurality of AND gates, OR gates, flip-flops, amplifiers or other circuitry.

A plurality of ICPs 11 are retained in an elongated molded plastic magazine 13. The magazine 13, which is described in detail in a co-pending, co-assigned application Ser. No. 50, 547, dated June 29, 1970, to Bohannon et al. entitled "Package," has a plurality of chambers 14—14 with a small round opening 16 in the top thereof and a fully opened bottom.

Referring now to FIG. 2, the ICP 11 is held in the top of the chamber 14 by a plurality of flexible tabs 17—17. The ICP 11 has a flat side 18 (FIG. 1) which sets against one of the side walls 15 of the chamber 14 to orient the ICP within the magazine 13. The ICP 11 is ejected from the chamber 14 by pushing downward through the hole 16 to force the ICP past the tabs 17—17 (FIG. 2) and out of the bottom of the chamber.

Referring now to FIG. 3, there is illustratively shown a circuit board 21 (e.g., such as that employed in a logic chassis of a computer). The board 21 has a plurality of hole patterns 22—22, each pattern selectively located to receive the leads 12—12 (FIG. 1) of the corresponding ICP. The ICPs 11—11 are mounted in rows on the circuit board 21 (FIG. 3) with the leads 12—12 of the ICPs extending through the corresponding hole patterns 22 of the circuit board.

The circuit board 21 has first terminals 23 which are connected to a central power plane 26 in the board and second terminals 24 which are connected to a ground plane 27 on the board. After the ICPs 11—11 are inserted into the board 21, an automatic wiring machine (not shown) is used to make various electrical connections on the underside of the board between the leads 12—12 (FIG. 1) and the terminals 23 and 24 (FIG. 3).

Referring to FIG. 4, a novel machine, generally designated by the reference numeral 31, incorporating the principles of the present invention to automatically transfer a plurality of ICP components 11—11 from the magazine 13 (FIG. 1) to a desired location on the circuit board 21 (FIG. 3) will first be described with reference to the structure and operation of each part of the machine. The functional cooperation between the various parts of the machine as a unitary system will then be set forth.

HOPPER ASSEMBLY

Referring now to FIGS. 4 and 5, the machine 31 includes a hopper assembly 32. The hopper assembly 32 includes a plurality of open-ended compartments 33—33, respectively positioned in side-by-side relationship. The compartments 33—33 are defined by fixed side walls 34—34. The walls 34—34 of the compartment are equally spaced apart and in parallel alignment with an adjoining wall. An outer end wall 36 and an inner end wall 38 abut the corresponding ends of the side walls 34—34 to enclose the ends of the walls 34 and compartments 33.

As best seen in FIG. 5, a flat, horizontal track member 39 extends along the entire length at the bottom of the compartments 33—33 and continues as a plurality of extended U-shaped tracks 40—40 outward from the inner end wall 38 of each compartment where the tracks terminate open endly at a remote point from the inner end wall of the compartment.

It can be seen that the track member 39 is vertically spaced downward from the bottom of the respective end walls 36 and 38 and is also in the same vertical plane as the associated compartments 33—33. The depth of the track 39 is suitable to permit the magazines 13—13 to pass beneath the end wall 38.

An air cylinder 41 is mounted parallel to and below each of the extended track members 40—40 and is supported by a bracket member 42. A piston rod 43 extends from each cylinder 41 along the underside of the track member 39 and is engageable to move from the inner end wall 38 to a position beneath the outer end wall 36. A pawl 44 is affixed to the end of each rod 43, and projects through a respective one of a plurality of elongated slots 45—45 extending through the track member 39, each slot centrally situated beneath a respective compartment 33. The pawl 44 is pivotally mounted and spring biased to pivot in a clockwise direction away from the cylinder 41. A switch actuator 46 is likewise affixed near the end of each rod 43 and projects downwardly therefrom.

A first switch 47 is positioned directly beneath the outer end wall 36 and is engaged by the actuator 46 when the rod 43 is extended to position the actuator directly beneath the outer end wall. A second switch 48 is situated directly beneath the inner end wall 38 and is engaged by the actuator 46 in like manner when the rod 43 is retracted to position the actuator directly beneath the inner end wall.

To load and dispense the magazines 13 from the hopper assembly 32, a plurality of magazines are manually loaded into each of the compartments 33—33 from the tops thereof so that the magazines are stacked from top to bottom. The air cylinder 41 is next actuated by a control switch 49 which is alternately actuated by the respective switches 47 and 48 to cause the air flow in the cylinder to traverse in respective opposite paths. The switches 47 and 48 are lever actuated switches, Model MV-15-T, manufactured by the Mead Corporation, Chicago, Ill. The switch 49 is a conventional four-way, air operated switch. A suitable switch of this type is manufactured by the Aro Air Products; Argol, Indiana and is commercially identified by the serial number 5040-35. Initially, the switch 49 is operated to advance the rod 43 to an extended position so that the end of the rod is situated beneath the outer end wall 36 of the compartment 33. This advances the pawl 44 beneath the end wall 36 in the slot 45 of the track member 39. It is noted that the bottom magazine 13 in the compartment 33 drops into position on the track 39.

When the rod 43 is advanced to the extended position, the pawl 44, which is spring biased in a clockwise direction, slides along the bottom of the magazine 13 and then pivots into the slot 45 of the track 39 after clearing the end of the magazine. Simultaneously, the actuator 46 engages the switch 47 to reverse the air flow in the cylinder 41, thereby moving the rod 43 in the opposite direction. The movement of the rod 43 also causes the pawl 44 to move along the slot 45 against the trailing end of the magazine 13 situated on the track 39 to move the magazine along the track and underneath the inner end wall 38 into the extended U-shaped track member 40. When the magazine 13 is completely clear of the inner end wall 38, the actuator 46 is directly beneath the inner end wall and engages the second switch 48 to again reverse the air flow in the cylinder and return the rod 43 to its extended position beneath the outer end wall 36. Meanwhile, the second bottom most magazine 13 has fallen to the track 39 and the cycle is repeated. The second magazine 13 abuts the trailing end of the previous magazine 13 to advance it along the extended track 40 as the second magazine is advanced by the pawl 44. At the end of the extended track 40, the magazine 13 passes through a dispensing assembly 51 (FIG. 4).

DISPENSING ASSEMBLY

As seen in FIG. 4, the dispensing assembly 51 includes a piston arrangement having a row of pistons 52—52 that are employed to selectively eject ICPs from the chambers 14 of the magazine 13 (FIG. 1).

Referring now to FIG. 2, each piston 52 comprises a cylinder 53 having a bore 54 located within. Extending logitudinally, axially, and centrally through the cylinder 53 is a cylindrical hollow tube 55. Slidably mounted within the bore 54 and rigidly affixed to the tube 55 is mating piston 56. The piston 56 is normally urged upwardly by the bias of a spring member 57 retained between the bottom of the bore 54 and the piston 56.

An inlet 58 extends through the upper side of the cylinder 53 and communicates with an upper portion of the bore 54 to define an inlet port through which a pressurized fluid such as air is introduced. An outlet 59 extends through the lower side of the cylinder 53 and communicates with a lower portion of the bore 54 to define an outlet port through which the pressurized air is discharged from the cylinder. An air switch 60 communicates with the outlet 59.

A seal 61 is provided between the outer periphery of the piston 56 and the sides of the bore 54 to preclude leakage between the inlet port 58 and the outlet port 59, when pressurized air is introduced into the bore 54. A suitable air source 63 is employed to provide air to the inlet 58. A valve 64 intercepts the flow of air from the source 63 to the inlet 58 so that pressurized air may be selectively applied to the inlet to force the piston 56 downward against the spring member 57.

The piston arrangement is situated so that the tube 55 when in operation overlies the opening 16 of the chamber 14. Sufficient air is then introduced via the valve 64 into the inlet port 58 to force the piston 56 downward.

The movement of the piston 56, in turn, urges the tube 55 downward in engaging relationship with the ICP 11 to force the ICP past the tab 17 and out of the chamber 14. The switch 60 senses the air as it emerges from the outlet 59, and operates to close the valve 64. Correspondingly, the air supply to the chamber 54 is cut off and the pressure on the piston 56 ceases. The plunger 55 then retracts to its original position under the biasing action of the spring 57.

Referring now to FIG. 6, there is illustrated a mechanism 71 which allows the magazine 13 to advance one chamber at a time under the piston 52 (FIG. 2). The mechanism 71 (FIG. 6) includes a rotatable shaft 72 of fixed length defined by two ends. At one end of the shaft 72, a first semicircular cam 73 is affixed. A second like semicircular cam 74 is affixed between the ends of the shaft 72 spaced from the first cam 73. The spacing between the cams 73 and 74 is equivalent to one-half the length of the chamber 14 of the magazine 13, and first cam 73 is oriented to be off-set 90° from the second cam 74. A pinion member 76 is mounted on the shaft 72 a spaced distance from the second cam 74.

Situated beneath and engaging the cylindrical portion of the pinion 76 is a rack 77. Coupled to the rack 77 is an air cylinder 78 which, in turn, is connected to the air source 63 (FIG. 2). The air cylinder 78 (FIG. 6) also selectively communicates with a central opening 80 (FIG. 2) in the tube 55 via a conventional, electrically operated four way control valve 81 (FIG. 6) that is, in turn, connected to an air switch 82. Air is supplied to the opening 80 by an air source 79 (FIG. 2).

The shaft 72, the rack 77, and the air cylinder 78 are suitably retained in proper position by a support member 83. An end 84 (FIG. 7) of the shaft extends through a wall of the support member 83 and is engageable with the bracket 42 (FIGS. 5, 6, and 7).

Referring specifically to FIG. 7, the end cross section 84 of the shaft 72 which extends through the wall of the support 83 has a small hollow well 85 formed therein. The shaft 72 is resiliently mounted through the support member 83 such as by spring loading via a suitable spring member 86 situated about the shaft and retained between the pinion 76 (FIG. 6) and the wall of the support member. A small tolerance is maintained between the end 84 (FIG. 7) of the shaft 72 and the bracket 42 to define an open chamber 87 which is defined by the well 85 and the bracket 42.

Air is introduced from a source 88 (FIG. 6) into a first opening 89 (FIG. 7) in the bracket 42 which communicates with the chamber 87. A second opening 90 in the bracket 42, also communicating with the chamber 87, is connected to a sensing switch 91 (FIG. 6). With the chamber 87 in a normal open position (FIG. 7), as aforedescribed, air passes from the source 88 through the opening 89 into the chamber and out thereof via the tolerance between the bracket 42 and the end 84 of the shaft 72.

Referring to FIG. 6, when a chamber 14 of the magazine 13 is underneath the tube 55, the cam 73 is positioned such that a face of the cam abuts a forward outer wall 19 of the chamber 14. When the wall 19 is in proper position against the cam 73, the force of the wall against the cam will urge the shaft 72 into engaging relation with the bracket 42 to close the chamber 87 (FIG. 7). With the chamber 87 closed, air entering from the opening 89 (FIG. 7) is now forced out through the second opening 90 (FIG. 7) and is detected by the switch 91. The sensing of the outlet air by the switch 91 indicates that the chamber 14 is in the proper position under tube 55. The switch 91 submits a signal to a control device (not shown) which opens the valve 64 (FIG. 2) to permit air to enter through the inlet 58 into the bore 54. Air also flows from the source 79 (FIG. 2) into the opening 80 of the tube 55.

When an ICP 11 is in a position in the chamber 14 (FIG. 6) beneath the tube 55, the air traveling through the opening 80 (FIG. 2) in the tube is restricted. This creates a back-pressure within the tube 55 which is sensed by the switch 82 (FIG. 2). With the cam 73 in an upward engaging position against the wall 19, the switch 82, sensing the back pressure from the air in the opening 80, operates to prevent air from entering the cylinder 78 from the source 63 by placing the control 81 in a closed position. The air in the bore 54 (FIG. 2) forces the tube 55 downward into the chamber 14 where it ejects the ICP 11 from the chamber (FIG. 6). The restricted air is then permitted to pass from the opening 80 in the tube 55 through the opening 16 in the chamber to relieve the back pressure within the tube. Simultaneously, air also passes from the outlet 59 (FIG. 2) to the switch 60 communicating therewith. As stated previously, when the switch 60 senses the flow of air from the outlet 59, it immediately actuates to close the valve 64 (FIG. 2). The tube 55 then retracts to its original position as aforedescribed.

Referring to FIG. 2, when an ICP 11 is ejected from the chamber 14, the switch 82 senses the drop in back pressure in the opening 80 due to the now unrestricted flow of air from the opening to the opening 16 in the chamber 14. After the tube 55 has returned to its original position, the switch 82, via a suitable time delay mechanism (not shown) then acts to open the control valve 81 (FIG. 6). Referring to FIG. 6, air enters and actuates the cylinder 78 to advance the rack 77 and rotate the pinion 76 in a counterclockwise direction. The cam 73 thus moves out of engagement with the wall 19 of the chamber 14. As pressure is constantly being exerted on the magazine 13 from the succeeding magazines traversing the track 40 from the hopper assembly 32 (FIG. 5), the magazine 13 advances in the direction of the arrow (FIG. 6), as previously described. The wall 19 of the chamber 14 next abuts the cam 74 which has been rotated into engaging relation with the wall. In this position, the tube 55 is over a top enclosed surface of the magazine 13. This again restricts the flow of air through the opening 80 creating back-pressure which is sensed by the switch 82. The switch then acts to close the valve 81 thus reversing the flow of air in the cylinder 78. Accordingly, the rack 77 reverses its movement to rotate the pinion in a clockwise direction back to its initial position. The cam 74, in turn, moves out of engagement with the wall 19 and the magazine 13 advances to a position where a corresponding wall 19 of the next chamber 14 abuts the cam 73 which is now in engaging position with the wall. The tube 55 is now positioned over the opening 16 of a second chamber 14 and a new ICP 11 is positioned to be ejected by the tube 55.

If there is no ICP 11 in the chamber 14, the switch 82 will act as if an ICP has been ejected from the chamber and will operate to open the valve 81 and actuate the cylinder 78 in a manner as previously described. The magazine 13 will advance to a forward position until a corresponding chamber 14 having an ICP 11 is situated beneath the tube 55.

Referring now to FIG. 2, the switch 60, which senses the completion of the downward stroke of the tube 55, is a conventional air-operated sensing switch such as that manufactured by Custom Components Inc., Chadsworth, Col., model number 607G173. The switch 82, which senses the presence or absence of an ICP 11, and the switch 91 which senses the proper position of the magazine 13 are commercial air-operated electrical switches. A typical switch of this type is illustratively manufactured by Fairchild Controls, Hicksville, N.Y. under the trade name Faircom Pressure Switches, model number PSF-100A.

COLLECTOR BAR ASSEMBLY

Referring now to FIGS. 1, 4, and 8, as the ICPs 11 are ejected from the magazine 13 by the downward movement of the tube 55, they are inserted into a collector bar assembly 92.

As best seen in FIG. 1, the collector bar assembly 92 includes an elongated base 93 that is mounted for movement in an axial direction via a screw mechanism 94. Coupled to the screw mechanism 94 is an appropriate indexing motor 96 (FIG. 4). A collector bar 97 (FIG. 1) is centrally mounted on the base 93 and is illustratively secured in place by two extended L-shaped flanges 98 and 99.

The bar 97 has an upward projecting, centrally located elongated U-shaped configuration which defines a channel 100 sandwiched between two projected walls 101 and 102. Situated within the channel 100 and extending upwardly therefrom are a plurality of small rectangular inserts 103—103. The inserts 103 are vertically movable to float within the channel 100. This movement is regulated by a corresponding plurality of rectangular insert actuators 104—104 that are situated within openings 105—105 in a side of the bar 97 (one of which is illustrated in FIG. 8). As seen in FIG. 8, the actuator 104 has an interior bevelled edge 106, which communicates with the lower edge of a respective insert 103, such that any force exerted downward upon the insert will cause the actuator to slide outward from the channel 100 and the opening 105 permitting the insert to rest on the bottom of the channel. Correspondingly, any force exerted laterally from the opposite end on the actuator 104 will bevel the insert 103 upward from the bottom of the channel 100 toward its initial position. Conveniently, the actuator 104 may alternately be spring loaded to retract back into extended position after the latter operation. In this case, the inserts 103—103 must snugly fit within the channel 100.

Referring back to FIG. 1, the top surfaces of the walls 101 and 102 projecting above and on each side of the channel 100 have a plurality of first hole patterns 107—107 extending therein (only the hole patterns in the wall 102 can be seen). Each hole pattern 107 on the wall 102 is symmetrically opposite the pattern on the wall 101 and the pattern on each wall is spaced a fixed equal distance from a corresponding preceding hole pattern. A second series of hole patterns 108 extend through the top surfaces of the inserts 103. Each insert 103 is aligned in the channel 100 between the walls 101 and 102 so that the holes 107 in the walls and the holes 108 in the insert conform to a pattern that complements the configuration of the terminals 12—12 of an ICP 11.

Actuation of the motor 96 (FIG. 4) drives the screw mechanism 94 to advance the collector bar assembly 92 to a position beneath the dispensing assembly 51. In this position, a selected series of magazines 13 (one of which is shown in FIG. 1) is directly over any one of the corresponding patterns defined by the holes 107 and 108 of the collector bar 97. Also, the actuator 104 is pushed inward by a suitable camming device (not shown) to elevate the insert 103. An ICP 11 is then ejected from an overlying chamber 14 of the magazine 13, as aforedescribed, so that the ICP terminals 12—12 nest in the pattern defined by the holes 107 and 108 in the collector bar 97. The downward movement of the raised insert 103 caused by the force of the ICP 11 insures that the ICP clears the magazine 13 as it falls in place in the collector bar 97. After a selected row of ICPs 11—11 have been deposited on the plurality of hole patterns 107 and 108 on the collector bar 97, the motor 96 (FIG. 4) drives the screw mechanism 94 to advance the collector assembly 92 to a position under a transfer station assembly 111 (FIG. 4).

It is to be understood that a plurality of different coded ICPs 11 can be inserted in any desired position on the collector bar 97 in a manner to be hereinafter described.

TRANSFER STATION ASSEMBLY

Referring now to FIGS. 4 and 8, the transfer station assembly, generally designated as 111, has two lower plates 112 and 113 (FIG. 8) which are spring biased by a pair of respective leaf springs 114 and 115. Extending up from the plates 112 and 113 are a respective pair of opposed walls 116 and 117. The walls 116 and 117 are resiliently mounted via opposing spring plates 118 and 119 to allow respective springs 114 and 115 to close. Situated between the walls 116 and 117 is an enclosed centrally located pressure chamber 120. Slidably mounted within the chamber 120 is a necked-down piston 122. Affixed to the lowermost end of the piston 122 is a piston head 123. The piston 122 is normally urged upward by the bias of a spring member 124 mounted about the piston and supported by a ledge 125 centrally located about the wall of the chamber 120. Stops 126 and 127 provide suitable supports for the respective springs 114 and 115. An air chamber 128 operates to open the plates 112 and 113 against the springs 114 and 115.

Referring back to FIG. 4, the transfer station assembly 111 is mounted between vertical brackets 131 and 132. The bracket 131 is mounted for horizontal movement on a vertical support 133 which overhangs the collector bar assembly 92. Also mounted on the bracket 131 is an air cylinder 134 having a piston 136 extending therefrom. The cylinder is also mounted to the support 133 by a suitable bracket 137.

Referring again to FIG. 8, it is seen that the collector bar assembly 92 has been indexed by the motor 96 (FIG. 4) to a position directly underneath the transfer station assembly 111. The assembly 111 had previously been lowered by a suitable underlying air cylinder 138 (FIG. 4) communicating therewith so that the plates 112 and 113 (FIG. 8), are situated in engaging relationship with the ICPs 11 mounted, as aforedescribed, on the collector bar 97. The plates 112 and 113 are initially in an open position. This is accomplished by the introduction of pressurized air from a source (not shown) into the chamber 128 to expand the springs 114 and 115. To compress the springs 114 and 115 and close the plates 112 and 113 beneath the edges of the ICPs 11-11 located on the bar 97 the air is released from the air chamber 128. Next, air is introduced into the chamber 120 via a suitable air port 121 located within the assembly 111. Pressure is thus created within the chamber 120 which forces the piston 122 downward against the spring 124 until the piston head 123 of the piston 122 engages the top of an ICP 11. However, if there is no ICP 11 present the piston 122 moves downward against the spring 124 until the head 123 of the piston 122 engages the plates 112 and 113. In this position the downward movement of the piston 122 stops. The assembly 111 is then raised from the collector bar 97 by actuating the underlying cylinder 138 (FIG. 4) that previously lowered the assembly into position. A suitable switch then actuates the cylinder 134 (FIG. 4) to move the rod 136 to a position so that the assembly 111 is over a table 161 which supports a printed circuit board (such as the printed circuit board 21 in FIG. 3). The transfer assembly 111 (FIG. 4) is again lowered by the cylinder 138 to an engageable position with the board 21, and the walls 116 and 117 (FIG. 8) are then expanded, as aforedescribed, to open plates 112 and 113. Correspondingly, each of the pistons 122, whose piston head 123 engages the ICP 11, moves downward under the force of the compressed air in the chamber 120 to push the leads 12 of the ICP further downward into the hole patterns 22 (FIG. 3) of the board 21. The ICPs 11 continue their downward movement by freely falling into place in the board 21 (FIG. 3). The assembly 111 is then raised by the cylinder 138 out of engagement with the board 21, and the cylinder 134 is actuated to return the assembly back to its initial position where it may be in overlying relationship with the collector bar assembly 92 (FIG. 8).

Meanwhile, the collector bar assembly 92 has been indexed by the motor 96 to return to an underlying relationship with the dispensing assembly 51 to receive additional ICPs 11. A camming device (not shown) may be mounted in juxtaposed relationship with the collector bar 97 (FIG. 8) to engage the actuators 104 for movement to raise the inserts 103 to an upward position as the collector bar 92 is returned to a receiving position.

As seen in FIG. 8, the collector bar 97 is mounted for movement in a circular motion on the base 93. A vertical rotatable shaft 141 is centrally mounted at each longitudinal end of the base 93 (only one shaft 141 is shown in the drawing). A rotating pinion 142 is connected to the lower end of each shaft 141 and engages a rack 143 which is also mounted at each end of the base 93. The rack 143 is actuated by a suitable air cylinder coupled to a pressurized air source 144. Affixed to the top of the shaft 141 is a circular disc 146. Mounted on the disc 146 is an off-centered projection 147 which suitably fits into a complementary indent 148 in the bottom of the collector bar 97.

The cylinder coupled to the air source 144 is suitably actuated to move the rack 143 in a direction to rotate the pinion 142. The rotation of the pinion 142, in turn, rotates the shaft 141 and the disc 146 in one direction through a 360° cycle. The air flowing through the source 144 is then reversed and the projection 147 reverses its cycle to return to its original position. The projection 147 rotates in a symmetrical orbit, and the reciprocal movement of the projection within the indent 148 of the collector bar 97 imparts a reciprocal circular motion to the collector bar. A closed chain or other loop (not shown) connecting the periphery of the disc 146 at one end of the base 93 with an identical disc located at the other end of the base 93 provides uniform reciprocal circular motion throughout the entire length of the collector bar 97.

Referring to FIG. 1, the openings 107 in the walls 101 and 102, and the openings 108 in the inserts 103 of the collector bar 97 are bevelled radially outward at the top so that the openings will receive any of the leads 12 which might have become bent during prior processing.

Consequently, there is a distinct possibility that any of the ICPs 11 dispensed on the collector bar 97 might have one or more bent lead. However, the openings 22 (FIG. 3) on the circuit board 21, which subsequently receive the ICPs 11, are not bevelled, therefore, a bent lead 12 (FIG. 1) cannot be inserted into a respective opening 22 (FIG. 3). Accordingly, the rotation of the bar 97 (FIG. 8) as aforedescribed, straightens the leads 12 by imparting a force to the leads which overcomes any force exerted on a lead that places it in a bent condition. This enables restoration of any bent leads 12 to a normal downward orientation before transfer to the circuit board 21 (FIG. 3).

OPERATION

The operation of the machine 31 (FIG. 4) will be described with reference to manufacturing a circuit board having a desired circuitry such as the circuit board 2, as illustrated in FIG. 3.

The ICPs 11, which are housed in the magazines 13 (FIG. 1), are made in a selected number of different codes. Each of the magazines 13 correspond to a particular code of ICP 11. As illustratively pointed out in the above referred to copending application, Ser. No. 50,547, the edges of each magazine 13 are formed with a particular notch, such that it may only be inserted into a respective notched compartment 33 (FIG. 4) corresponding to the particular code of an ICP 11 within the magazine.

A conventional tape feed numerical control unit (not shown) is employed to program the entire operation of the machine with the exception of the transfer of the ICPs 11 from the collector bar 92 to the printed circuit board 21. An air sequencer system, which is to be hereinafter described, is employed for the latter operation. For the numerical control, a suitable unit is manufactured under the general trade name of "Slo-Syn Numerical Control System" by the Superior Electric Co., Bristol, Mass.

Referring now specifically to FIG. 5, a plurality of magazines 13 are loaded into the top of the compartments 33—33 and are dispensed from each compartment at the bottom thereof onto the track member 39. The magazines are conveyed from individual tracks 39 to the extended tracks 40 by actuating the air cylinders 41. The magazines are continuously conveyed until the first chamber 14 of the leading magazine in each compartment 33 is situated in a position beneath a corresponding piston 52 (FIG. 4) of the dispensing assembly 51. In this position, the continuous movement of each magazine 13 is temporarily intercepted by the mechanism 71 (FIG. 6) of the dispensing assembly 51 (FIG. 4).

Referring now to FIG. 3, it is seen that the circuit board 21 comprises a plurality of rows 151—154 containing coded ICPs 11, which constitute a desired circuit. It is to be noted that any coded ICP 11 may occupy any position on the circuit board 21 dependent upon the desired circuitry of the board. Illustratively, in the row 151, going from left to right, an ICP 11 is inserted in the pattern 22 in a first position, a second position, and a fourth position. For purposes of further illustration, the ICP in the above-mentioned first position in row 151 is a code 9 ICP; the ICP in the above-mentioned second position is a code 3 ICP; and the ICP in the above-mentioned fourth position is a code 7 ICP. The code number of the ICP is defined from the slot 33 from whence it came in the hopper assembly. Accordingly, a code 9 ICP would come from a magazine situated in the ninth slot of the hopper assembly 32, going from right to left in FIG. 4; a code 3 ICP would come from a magazine situated in the third slot from the right in the hopper assembly; and a code 7 ICP would come from the seventh slot from the right in the hopper assembly.

To select the ICPs making up the row 151 of the circuit board 21, the numerical control unit is programmed to actuate the motor 96 (FIG. 4) to index the collector bar assembly 92 (FIGS. 1 and 4) to a sequence of positions beneath the plurality of coded magazines 13—13 (FIG. 5). Illustratively, the control unit reads out a number that is equivalent to the sum of the code number and position where the ICP 11 is to be inserted on the collector bar 97 (FIG. 1) to determine a corresponding distance the collector bar assembly 92 must be indexed before ejecting a desired ICP in the proper insert 103 on the collector bar 97. For the above-mentioned first position on the row 151 of the circuit board 21, the control unit would read out a 10, which represents the sum of the first position plus the code 9. For the above second position in row 151, the unit would read out a 5, which indicates the sum of the second position plus the code 3. For the third position in the row 151, the unit would not read since there is no ICP to be inserted in the third position. For the above fourth position, the unit would read out an 11, which indicates the sum of the fourth position plus the code 7.

As seen in FIG. 4, the above-described positions on the pistons 52 and the collector bar 97 (FIG. 1) are in reverse ascending order to the positions of the coded slots 33 (FIG. 4) of the hopper assembly 32. This arrangement permits the collector bar assembly 92 to be initially indexed to the distance having the corresponding lowest number, and further sequentially indexed inwardly to distances having ascending numbers. Consequently, in a series of indexing operations, the collector bar assembly 92 would initially be indexed to the distance having the lowest number, in this instance 5, where the collector bar 97 (FIG. 1) would be thus positioned so that the second insert 103 of the collector bar would be situated under the third piston 52 (FIG. 4) of the dispensing assembly 51. The piston 52 is then actuated to eject the code 3 ICP 11 (FIG. 1) from the chamber 14 onto the respective hole patterns 107 and 108 representing the above second position of the collector bar 97 in a manner as described with reference to FIGS. 1 and 8. After ejection of the ICP 11 into the collector bar 97 and return of the piston 52 (FIG. 2) to its initial position, the collector bar assembly 92 (FIG. 4) is then indexed to the distance having the next ascending number 10, where the first insert 103 (FIG. 1) of the collector bar 97 underlies the ninth piston 52 (FIG. 4) of the dispensing assembly 51. The corresponding ninth piston 52 overlies the ICP 11 (FIG. 1), and ejects the code 9 ICP into the hole patterns 108 and 109 representing the above first position of the collector bar 97 in a similar manner, as above. The collector bar assembly 92 is then indexed to 11 the distance having the highest number so that the fourth insert 103 underlies the seventh piston 52 of the dispensing assembly 51 where the code 7 ICP 11 (FIG. 1) may be ejected into hole patterns 108 and 109 representing the fourth position of the collector bar 97. Upon ejection of each of the ICPs 11 of a given row onto the collector bar 97 (e.g., the three ICPs 11 in row 151 (FIG. 3) of the circuit board 21) the corresponding magazine 13, having the empty chamber 14 situated under a corresponding piston 52, is then advanced by the mechanism 71 FIG. 6 so that a new chamber 14, having an enclosed ICP 11, is situated therebeneath, as aforedescribed. After a row of ICPs 11 (FIG. 3) have been ejected on the collector bar 97 (FIG. 1) the motor 96 (FIG. 4) is actuated by the control unit to advance the collector bar assembly 92 to a position beneath the transfer station assembly 111 (FIG. 8) which is now in a lowermost position with the gripping members 112 and 113 open. At this position, a pulse is transmitted by the control unit, which energizes a valve V (FIG. 9) that actuates the air sequencer system.

Figure 9:
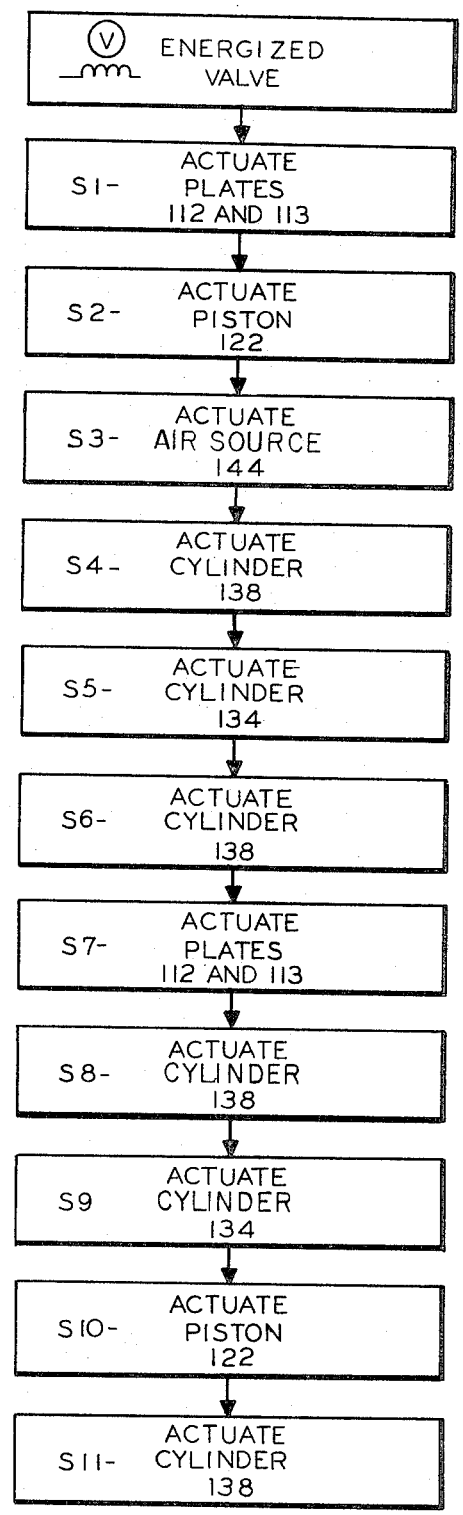
FIG. 9 is a schematic of an air circuit employed to automatically operate the transfer of the components from the collector bar to the circuit board after the components have been dispensed thereon.

Referring now to the schematic in FIG. 9, the valve V upon being energized sequentially opens a series of air switches S1–S11. The switches S1–S11, when open, operate to perform a series of steps which effect the transfer of the row of ICPs 11 on the collector bar 97 (FIG. 1) to the row 151 (FIG. 3) of the circuit board 21.

Again referring to FIG. 9, the steps include first releasing air in the chamber 128 to permit springs 114 and 115 to close the plates 112 and 113 (FIG. 8), which correspondingly grip each of the plurality of ICPs 11 on the collector bar 97 as aforedescribed with reference to FIG. 8. Next, the piston 122 (FIG. 9) is actuated to force the piston head 123 (FIG. 8) into a downward engaging relationship with the top of an underlying ICP 11. Each ICP 11 is now held firmly in position by the plates 112 and 113 and the piston head 123. Circular motion is then imparted to the collector bar 97 to straighten any bent leads 12 on each ICP 11 by actuating the air source 144 (FIG. 9) to rotate the shaft 141, as aforedescribed. After straightening any bent leads 12 (FIG. 8) of each ICP 11, the cylinder 138 (FIG. 9) is actuated to raise the transfer assembly 111 (FIG. 4) and lift the row of ICPs 11 (FIG. 8) from the collector bar 97. When the assembly 111 reaches an uppermost position, the cylinder 134 (FIG. 9) is actuated to extend the piston 136 (FIG. 4) and advance the assembly from a position over the collector bar assembly 92 to a position over the circuit board 21, which is affixed to an indexing table 161.

Prior to the energization of the air sequencer, an indexing motor 162, similar to the indexing motor 96, indexes the table 161 via a suitable screw mechanism 163 to advance the table to a position such that the row 151 (FIG. 3) of the circuit board 21 is situated directly beneath the path of the assembly 111 (FIG. 4). The motor 162 is operated by the numerical control unit.

Referring back to FIG. 9, the cylinder 138 is again actuated to move the assembly 111 (FIG. 8) downward to a lowermost position so that the terminals 12 of the ICPs 11 are inserted into the desired hole patterns 22 (FIG. 3) in the row 151. The plates 112 and 113 (FIG. 8) are then opened by actuating the walls 116 and 117 (FIG. 9) and the ICP 11 (FIG. 8) is allowed to pass freely therethrough under the force of the now moving piston head 123. The head 123 pushes the ICP 11 downward into a position such that the leads 12 (FIG. 1) are captured by the openings 22 (FIG. 3) in the circuit board 21 and then ceases movement when the piston 122 (FIG. 8) engages the plates 112 and 113. (The head 123 conveniently has a diameter larger than the space between the opened plates 112 and 113). Next the cylinder 138 (FIG. 9) is again actuated to lift the assembly 111 (FIG. 8) to an uppermost position. The cylinder 134 (FIG. 9) is then actuated to convey the assembly 111 (FIG. 8) to a position over the collector bar assembly 92. Air is then bled from the chamber 120 (FIG. 8) to actuate the piston 122 (FIG. 9) so that it retracts to its original position via the upward bias of the spring 124 (FIG. 8). The assembly 111 is then lowered to its lowermost position with the members 112 and 113 still in an open position by actuating the cylinder 138 (FIG. 9). When the assembly 111 (FIG. 8) reaches its original lowermost position the air sequencer system (FIG. 9) is automatically de-energized. The assembly 111 (FIG. 8) remains in position until the system senses another pulse from the control unit which again opens the valve V (FIG. 9) and energizes the system for another series of operations.

Meanwhile, the valve V may be closed at any interval of the sequencer system cycle after the switch $S_4$ has been opened to actuate the transfer of the ICPs 11 (FIG. 8) from the collector bar 97 to the transfer assembly 111 by a suitable timing device (not shown). Closing the valve V (FIG. 9) re-energizes the numerical control to return the collector bar assembly 92 (FIG. 4) back to its initial position to undergo another series of indexing operations to receive the ICPs 11 (FIG. 3) for the row 152 of the circuit board 21. The air sequencer system (FIG. 9) will continue to operate after closing the valve V to finish its series of operations until the switch $S_{11}$ has completed its cycle as aforedescribed. However, it is essential that the valve V not be closed before transfer of the row of ICPs 11 (FIG. 8) from the collector bar 97 to the transfer assembly 111, else the collector bar assembly 92 will be programmed to return before transfer of the ICPs. By selectively closing the valve V (FIG. 9) after opening the switch $S_4$ coordination between the numerical control and the air sequencer systems can be effected to continuously operate the machine 31 (FIG. 4) without intermittent interruption of the cycle.

As was illustratively shown with reference to row 151 (FIG. 3), the ICPs 11 in row 152 can be of any desired code depending upon the desired circuitry, and the collector bar 97 (FIG. 8) is sequentially indexed beneath the dispensing mechanism 51 (FIG. 4) in the same manner as aforedescribed with reference to the row 151 (FIG. 3).

If during the dispensing of the coded ICPs 11 (FIG. 1) from the chamber 14 of the magazine 13, the numerical control should read out identical sums for each ICP to be inserted in each position on the circuit board 21 (FIG. 3), then the plungers 52 (FIG. 4) would dispense the ICPs 11 (FIG. 1) having the same sum simultaneously onto the circuit board 21 (FIG. 3). For example, referring to FIG. 3, the row 152 has an ICP in each of the first, second, third, and fourth positions. Illustratively, the ICP in the first position is a code 4, the ICP in the second position is a code 3, the ICP in the third position is a code 2, and the ICP in the fourth position is a code 1. In this instance, the sum of the code and position of each ICP in the row 152 is 5. Thus, the numerical control would read out a location 5 for each ICP 11 in the row 152. The collector bar assembly 92 (FIG. 4) is then indexed so that the fourth plunger 52 of the dispensing assembly 51 is situated over the first insert 103 of the collector bar 97, the third plunger 52 is situated over the second insert, the second plunger 52 is situated over the third insert, and the first plunger 52 is situated over the fourth insert. In this position, all the ICPs are dispensed simultaneously from the magazine 13 onto the collector bar 97. As pointed out, with reference to FIG. 4, the positions of the compartments 33 numerically ascend right to left and the position of the inserts 103 (FIG. 1) on the collector bar 97 and the plungers 52 numerically ascend from left to right.

The operation of the machine 31 (FIG. 4) continues until ICPs have been inserted into the rows 151 through 154 and the circuit board 21 is completed.

If at any time the operation of the machine 31 (FIG. 4) should become faulty, conventional switch controls connected to the various assemblies may be employed to stop the machine.

One typical control of this type is illustrated in FIG. 8. An opening 171, which passes through the structure of the assembly 111, communicates with the chamber 120 and is also coupled to a sensing switch 172 outside of the assembly. When the piston head 123 engages the head of an ICP 11 gripped between the plates 112 and 113, the lower end of the piston 122 is slightly above the opening 171. This prevents communication between the chamber 120 and the opening 171. Thus, air does not flow through the opening 171. Upon opening of the plates 112 and 113, and actuation of the piston 122 to cause the head 123 to move downward to force the leads 12 of the ICP 11 into the openings 22 (FIG. 3) of the circuit board 21, the piston 122 (FIG. 8) engages the opening 171 and air flows therethrough from the chamber 120. This air is detected by the switch 172 and a signal is generated indicating a successful transfer of the ICP 11 into the proper position on the circuit board 21 (FIG. 3). However, if the leads 12 of the ICP 11 do not enter the openings 22 of the board 21, under the force of the head 123 (FIG. 8), the piston 22 will not engage the opening 171, and air will not flow therethrough. Accordingly, the switch 172, not sensing the air, will not generate a signal to allow the machine 31 (FIG. 4) to continue to operate. If there is no ICP 11 (FIG. 8) present during the aforedescribed insertion operation, the piston head 123 will move downward until it engages the gripping member 112 and 113, as aforedescribed. The piston 122 will, likewise, engage the opening 171, permitting air to pass therethrough and be detected by the switch 172, thus generating the necessary satisfactory signal.

It should be noted that the above-described machine is merely illustrative of the principles of the invention. The machine is not limited to the performance of only mounting ICPs on a printed circuit board. It is to be understood that the machine may be employed wherever it is desired to selectively transfer different coded components to another location, in any desired manner. In addition, the structure of the machine and its mode of operation may be modified by persons skilled in the ordinary art without departing from the scope of the invention.

What is claimed is:

1. An apparatus for selectively ejecting different coded components from a plurality of magazines for transfer to a preselected location on a workpiece, comprising:
   means for housing the plurality of magazines;
   means for ejecting the components from the magazines;
   means for continuously advancing the magazines from the housing means to the ejecting means;
   means for incrementally halting the magazine as they are conveyed to the ejecting means to position a component at a desired position to be ejected;
   means mounted for movement to a sequence of desired positions beneath the ejecting means to collect the different coded components at each position as they are ejected from the magazine; and
   means rendered operative upon the movement of said collecting means from the ejection means for picking up and transferring the components from the collecting means to the selected positions on the workpiece.

2. An apparatus for inserting a plurality of different components in a workpiece wherein said workpiece has a plurality of locations for receiving said components and different types of components are inserted at different locations on said workpiece, said apparatus comprising:
   means for selectively dispensing each different type of component;
   means for receiving the dispensed components, said receiving means having component receiving locations which correspond to a predetermined number of locations on the workpiece;
   means for positioning said receiving means relative to said dispensing means to bring selected locations on said receiving means into a desired position with said dispensing means so as to dispense a desired type of component into said locations; and
   means for transferring said components from said receiving means to said workpiece and for inserting said components into desired locations in said workpiece.

3. An apparatus for automatically handling a plurality of magazines, each magazine having a plurality of desired coded components, to transfer the magazine to a position where the different coded components may be selectively ejected therefrom, and to further transfer the ejected components to preselected locations on a workpiece, comprising:
   a hopper assembly having a plurality of compartments, each compartment corresponding to a desired code indicative of the code of the component, and housing a series of the plurality of magazines;
   means operable to convey a magazine from each coded compartment of the hopper assembly to a location wherein a component from each of the magazines is situated at a predetermined position;
   means selectively movable into and out of any of the number of magazines situated at the predetermined position for ejecting desired components from the magazines;
   means selectively movable to any position beneath the magazines for collecting the ejected components in a row as they are ejected;
   means cooperating with the collecting means at a position from the ejecting means for transferring the row of components from the collecting means to a preselected row on the workpiece; and
   means for advancing the workpiece to a position to receive the row of components at the preselected location.

4. The apparatus of claim 3 wherein the conveying means includes:

a track member situated beneath and spaced from the plurality of compartments, the track member extending along the entire length of the compartments, terminating at a point remote from the compartments, and having a plurality of open slots, each slot extending axially therethrough along the length of each compartment; and means projecting through each slot for sliding the magazines along the track member.

5. The apparatus of claim 4 wherein the collecting means includes:

a base;

a plurality of patterns situated on the upper length of the base, each pattern spaced a fixed equal distance from a preceding pattern and complementing a pattern of the component; and means for indexing the base in an axial direction to position any one of the patterns beneath any component situated at the predetermined position.

6. The apparatus of claim 5 wherein the base includes:

a pair of rectangular flanges extending symmetrically along the upper length thereof in spaced parallel relation to define a centrally located channel;

a plurality of rectangular inserts slidably positioned in end-to-end spaced relationship within the channel, a part of each pattern situated on each insert, the remainder of each pattern situated symmetrically on the top of the flanges opposite each insert; and means for moving each insert in a vertical upward direction between the flanges.

7. The apparatus of claim 6 wherein the base further includes:

means for imparting circular motion to the base in a horizontal direction.

8. The apparatus of claim 4 wherein the transfer means includes:

means for simultaneously gripping the plurality of components situated on the collector means.

* * * * *